United States Patent
Singhal et al.

(10) Patent No.: US 7,076,562 B2
(45) Date of Patent: Jul. 11, 2006

(54) APPLICATION INTERMEDIATION GATEWAY

(75) Inventors: Umesh Singhal, Karnataka (IN); Vishal Lal, Uttar Pradesh (IN); Dax Abraham, Karnataka (IO); Badrinarayanan Krishnan, Tamil Nadu (IN); Jyothirmoy Chakravorty, Karnataka (IN); Rajesh Ts Reddy, Karnataka (IN)

(73) Assignee: July Systems, Inc., Santa Clara, CA (US)

(*) Notice: Subject to any disclaimer, the term of this patent is extended or adjusted under 35 U.S.C. 154(b) by 0 days.

(21) Appl. No.: 10/389,783

(22) Filed: Mar. 17, 2003

(65) Prior Publication Data

US 2005/0021818 A1   Jan. 27, 2005

(51) Int. Cl.
*G06F 15/16* (2006.01)
(52) U.S. Cl. .................................... 709/232
(58) Field of Classification Search ............. 709/217, 709/223, 232, 229
See application file for complete search history.

(56) References Cited

U.S. PATENT DOCUMENTS

| | | | | |
|---|---|---|---|---|
| 5,650,994 A | * | 7/1997 | Daley | 370/259 |
| 6,167,445 A | * | 12/2000 | Gai et al. | 709/223 |
| 6,330,586 B1 | * | 12/2001 | Yates et al. | 709/201 |
| 6,366,577 B1 | * | 4/2002 | Donovan | 370/352 |
| 6,408,336 B1 | * | 6/2002 | Schneider et al. | 709/229 |
| 6,467,090 B1 | * | 10/2002 | Brodigan | 725/87 |
| 6,526,582 B1 | * | 2/2003 | Brodigan et al. | 725/87 |

* cited by examiner

Primary Examiner—David Y. Eng
(74) Attorney, Agent, or Firm—William L. Botjer

(57) ABSTRACT

The present invention provides a system, method and computer program product for implementing application level policies in an operator network, while managing the exchange of data packets between users and service providers during the provisioning of premium data services. The present invention intermediates between a user and a service provider (who may be an enterprise, content provider, an application provider or a partner portal). The present invention enforces access control, prompting, redirection and inline context injection dynamically while the service is being delivered, and generates metering records for billing purposes. Prompting enables notifications and taking inputs from the user while the user accesses chargeable content or when the sharing of user data (profile or choice) occurs between the network and service provider. Inline context injection allows sharing of information regarding the users preference and profile, and capabilities of the devices between the users and the service provider.

12 Claims, 3 Drawing Sheets

APPLICATION INTERMEDIATION GATEWAY

BACKGROUND

The present invention relates to telecommunication networks. In particular, the invention relates to an infrastructure element that intermediates between users and service providers.

Most of the traditional wireless networks, which support the provision of various services (also called applications) to users, include three basic entities: a service provider, a network operator, and one or more users. The service provider provides several services to the user using the network operator's infrastructure. The service provider can be a content provider, an application provider, or a partner portal (who has a business relationship with the network operator). The network operator provides and maintains the basic network infrastructure over which the service provider provides various data and voice services. The user avails the services, which may either be free services, or paid/subscribed services, provided by the service provider.

Provision of services is an important means of revenue generation for operators as well as for service providers. Indeed, for increasing this revenue generation, services that manifest both value and convenience to consumers need to be provided using the network operator's infrastructure. Examples of some of the conventional services being provided include caller-line identification, call waiting, and call forwarding.

There have been several advancements in content creation of content-rich services and applications, as well in technologies of devices on which they can be used. For instance, in the wireless domain, there have been advancements in technology of mobile handsets. These devices are now enabled for handling "content-rich" services such as multimedia messaging (MMS). These advancements enable provision of "content-rich" services such as video streaming, downloadable music and online gaming. Provision of all these "content-rich" services lead to increased revenue generation, which is very much desirable for operators and for service providers.

Besides provision of "content-rich" services, there is also a huge opportunity of direct revenue generation for the operator while providing content and services. The operator has the billing relation with subscriber, subscriber profiles, subscriber context and knowledge of device capabilities. The operator can use this information in several advantageous ways. First, the operator can share this information with the service providers to offer better services. Second, this information can also be used for managing payment and transactions for billing purposes.

However, there are problems with the implementation of such services. To provide such services, the operator should be able to implement policies (primarily for enforcing service control) not only at the network level, but also at the application level. The service control needs to be enforced at various levels. Firstly, the operator needs to be able to exercise service awareness encompassing individual application and users. This means that the operator must be aware what services or applications a particular user is availing. Second, the operator needs to be able to deploy services without requiring significant changes in the network infrastructure. Third, the services need to be interoperable with leading service providers. Application interfaces need to be open so as to enable integration with third party applications for billing, provisioning of services, etc. In addition, the operator needs to be able to provide conditional access to users for example, for payment sites.

There are granted patents and products in the market which address a few of the issues discussed above. U.S. Pat. No. 6,466,984 titled "Method And Apparatus For Policy Based Management Of Quality Of Service Treatments Of Network Data Traffic Flows By Integrating Policies With Application Program" discloses a method and apparatus for integrating policies with application program to provide policy-based management of quality of service (QoS) treatments of network data traffic flows. The QoS policies are defined in context of the application programs. The network traffic is mapped to the corresponding policy. The relevant policy is then enforced on the network traffic at the network device. The policies are stored in a directory schema. This patent only relates to implementation of QoS based on application programs.

The "Application Switch" from Sylantro Systems, CA, USA is designed to support the infrastructure requirements of service providers by providing new service capabilities. The software architecture incorporates the data structures that support multi-tenant deployments. This platform acts as both the delivery mechanism and the development engine for a wide range of existing and new applications. The combination of the applications-enabled architecture and the complete suite of application modules allow a plurality of service providers to deliver a variety of telephony services over broadband networks.

The iVANi iServer Application Switch from NexTone Communications, MD, USA provides policy-based call routing and signaling mediation to deploy applications in an on-net IP environment. It also interoperates with softswitch and media gateway platforms for off-net calls to and from the public network. It also provides support for enhanced services and applications such as presence management, voice-data VPNs, unified messaging and multimedia conferencing. New services and applications can be added with the addition of a new application server to the network.

Alteon Application Switch 2224 from Nortel Networks, Canada is a multi-application switching system that performs Layer 2/3 switching and high-performance Layer 4–7 intelligent traffic management for applications such as server and network device load balancing, application redirection, security, and bandwidth management. The Alteon Application Switch 2224 can be used in server farms, data centers, and networks, handling up to two million concurrent sessions.

The prior art discussed above tries to implement policies at the application level. However, they are limited in their approach. The patent discusses policy implementation for QoS issues and not for other services that may be provided by an operator. The products also restrict themselves to being either a Voice over Internet Protocol (VoIP) switch or a telephony service switch.

Thus, there is a need for an invention that enables a service provider to deploy premium data services. Further, it should enable the service provider to implement policies at the application level for intermediation between the user and content provider, enterprise or a third-party application provider. Capability of billing and licensing for these enhanced services should also be provided to the operator.

SUMMARY

The present invention is directed towards an infrastructure element that intermediates between the network operator's core packet data delivery network elements and the applications.

An object of the invention is to provide a system, method and computer program product for an operator to implement application level policies on data packets in a network for intermediation between users and service providers.

Another object of the invention is to prompt the user and redirect the user to a different destination address. The present invention also provides access control.

Yet another object of the invention is to provide a system and method for provisioning data services over a network.

In order to attain the above-mentioned objectives, a system kernel receives data packets and inspects them. The system kernel determines the type of application by inspecting data packets. The data packets are forwarded to an application handler specific to the application identified by the system kernel. The context is injected in the header of data packets. A data parser parses the data and the application handler implements the application level policies on data packets. Data packets are then forwarded to the service provider. The service provider responds with necessary data to the application handler. The application handler forwards the response to the user.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Figure 1:
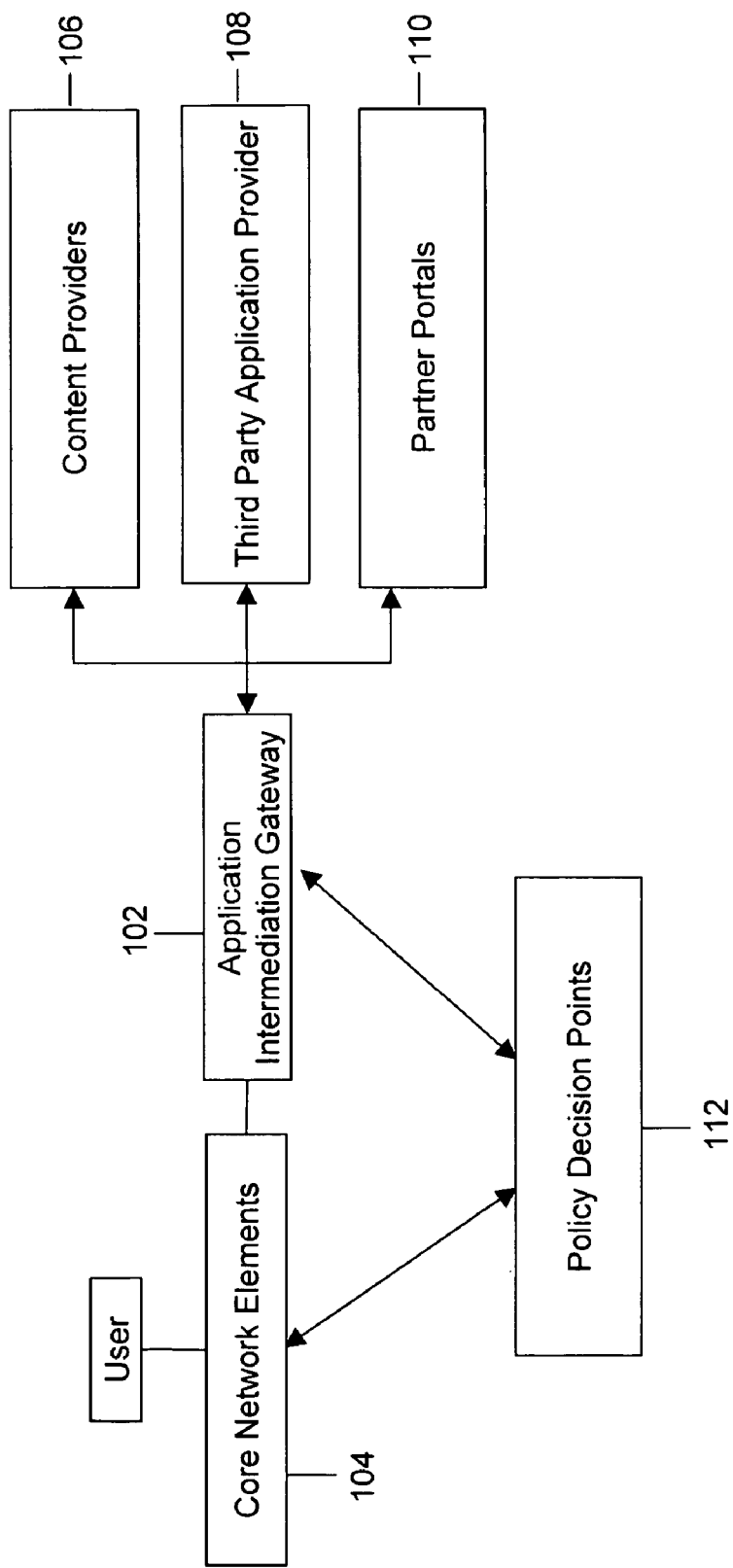
FIG. 1 is a block diagram representing the general environment in which an embodiment of the present invention functions.

The present invention is a system, method and computer program product for implementing policies at application level on data packets in a network for intermediation between users and service providers. The service provider may be a content provider, an application provider or a partner portal (who has a business relationship with the operator).

The network operator provides infrastructure for connecting users to content providers, application providers and partner portals. The network operator is the connecting link between the users and the service providers and enables the delivery of services to the user. The present invention allows application level policies to be implemented on data packets at the network operator level. The application level policies are set of rules that determine the actions to be carried out for a particular type of application. The present invention enforces access control, prompting, redirection and inline context injection. The present invention may also generate metering records for billing purposes while the service is being delivered.

The access control mechanism controls the access rights. It defines what source-destinations and the port numbers are to be allowed access. Some users are allowed to access some addresses but may be restricted from accessing other addresses. The present invention enables rejection of data packets from the sources that are blocked. Also, it enables the data packets to be directly passed to the opposite Ethernet interface, which connects to the service provider, without any modification.

Prompting facilitates notification to users about certain terms and conditions, such as paying some associated charges, for accessing content and applications. Prompting also enables taking an input from the user. For instance, when a user downloads an MP3 song from a content provider, the user is prompted with some terms and conditions, such as paying the associated charge. The download is permitted only after the user agrees to pay the associated charges. A charging record is then generated for billing the user.

Redirection enables transferring a request from the user to another (appropriate) destination. This is done by routing the data packets from one destination to another (appropriate) destination. The redirection may be for a variety of reasons. The redirection may be for the purpose of payment of service charges to access an application, denial of service, signing up a license agreement before the application can be accessed, download of software required for the application and redirection of call.

Context comprises information about device characteristics, network capabilities and user profile. Examples of device characteristics information include information about Hypertext Transfer Protocol (HTTP) version supported, image types supported, languages supported, destination host URL, browser make and version, and operating system make and version. Examples of network capabilities information include network type and network identifier. Examples of user profile information include personal data, the class of subscriber, the services subscribed to and the billing information. The context enables the content or application provider to realize the abilities of the user and provide better services. For instance, based on the device type used by the user, the content provider can adapt the content to the device screen.

When the user is accessing the content or the application, the present invention passes the context to the application inline. The context that is required to be passed may be decided by the service provider providing the content or the application. This may be done by selecting policies that the service provider wants to enforce. A policy is set of rules that govern the flow of data packets when a user requests for a service from a service provider.

FIG. 1 is a block diagram representing the general environment in which the present invention works. An Application Intermediation Gateway (AIG) 102 connects a plurality of core network elements 104 to a plurality of content providers 106, third party application providers 108 and partner portals 110. The Core network elements are the basic infrastructure elements of the network provided by a network operator. Exemplary core network elements 104 are Gateway GPRS Support Node (GGSN) and Packet Data Serving Node (PDSN). The data packets may originate from a user or a service provider. AIG 102 is deployed in the path between user and the service provider and transfers the data packets from one to another.

Core network elements 104 receive a user request from the user and pass it on to AIG 102. The user request is in form of data packets. AIG 102 implements the application level policies on the data packets. The decisions on application level policies are provided to AIG 102 by a Policy Decision Point (PDP) 112. PDP 112 may act as a policy controller for both core network elements 104 and AIG 102. AIG 102 also interacts with content providers 106, third party application providers 108 and partner portal 110. AIG 102 forwards the user request to the desired content provider 106, third party application provider 108 or partner portal 110, receives response to the request and forwards the response back to user.

In accordance with a preferred embodiment of the present invention, AIG 102 is deployed in an operator's network. However, it would be evident to a person skilled in the art that AIG 102 can be deployed in an enterprise local network as well.

Figure 2:
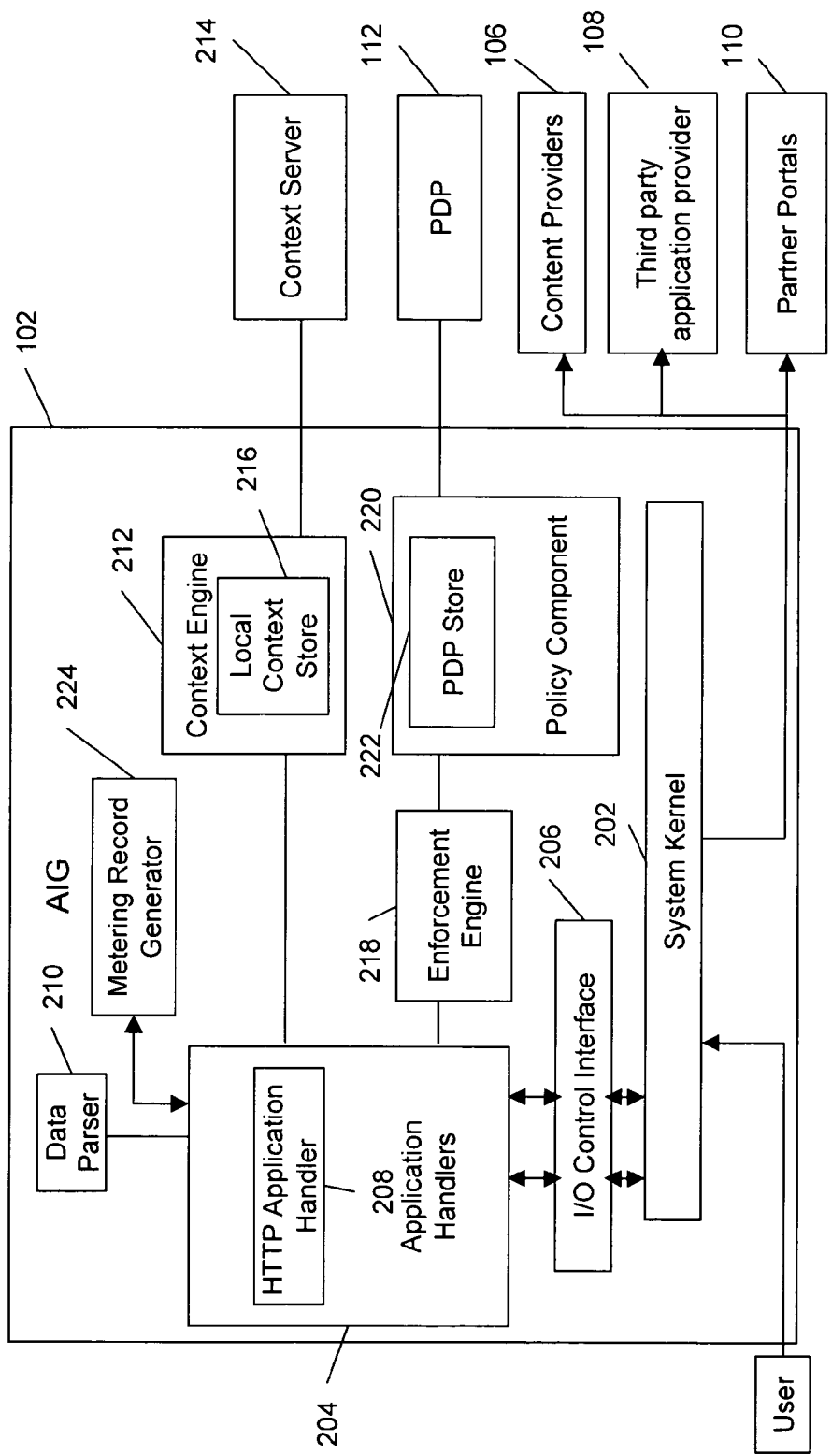
FIG. 2 is a block diagram of application intermediation gateway along with a policy decision point and a context server, in accordance with an embodiment of the present invention.

FIG. 2 is a block diagram of application intermediation gateway along with a policy decision point and a context server. AIG 102 receives a user request from a user through a system kernel 202. The user request is in form of data packets. System kernel 202 includes a kernel hook. The kernel hook is a stream driver that inspects the data packets to determine the source and type of data. Each data packet comprises a header portion and a body. The header portion has an IP header and a TCP header. The kernel hook unwraps the IP header of the data packets to determine the source and destination IP addresses and TCP header to determine the application type. The application type is determined by port number that is read from TCP header. The kernel hook also implements kernel rules. The kernel rules are rules that govern data packets at the network level. The kernel rules are controlled by the network operator through an administration interface.

Depending on the application type determined from TCP header, system kernel 202 redirects the data packets to the corresponding application handler of application handlers 204 through an I/O control interface 206 or to the opposite Ethernet interface. Exemplary application handlers are HTTP application handler, Post Office Protocol (POP) application handler and streaming application handler. The application handler to which the data packets are redirected is decided by the kernel rules. For instance, if the application is an Hypertext Transfer Protocol over Secure Socket Layer (HTTPS) request, the data is passed directly to the opposite Ethernet interface, but if it is HTTP request, it is passed to HTTP application handler. The kernel rules also determine which source and destination IP addresses are allowed to be accessed. The system kernel provides access only to those addresses.

Application handlers 204 receive the data from system kernel 202 through an I/O control interface 206. Application handlers 204 comprise a set of application handlers for handling different types of applications. I/O control interface 206 also communicates the data from application handlers 208 to system kernel 202.

In accordance with one embodiment, the present invention is envisaged to be working on an HTTP request. However, it will be evident to a person skilled in the art that the present invention can work on any other application type as well.

For an HTTP request, the data packets are passed to an HTTP application handler 208. HTTP application handler 208 performs application level access control to the user's requests. HTTP application handler 208 provides functionalities for inline prompts and allows users to make decisions while accessing the applications. HTTP application handler 208 also allows redirection of users. The redirection of users help integrating the users with content download sites and payment gateways.

Access control is performed by HTTP application handler 208 based on the context information. The access is controlled by policy defined by the network operator.

The user can be redirected to a URL different from the requested destination IP address. By way of an example, a user can be redirected to a relevant section of the website based on user's context or preferences. By way of another example, a user request to download software can be allowed only after the user makes a payment. For such a payment, the user can be transferred to a payment gateway.

Prompts are dialogue boxes providing one or more options. The options can be presented in form of buttons or clickable logos. Exemplary buttons can be 'OK' and 'CANCEL'. Prompts enable the user to make choices while they are accessing the application. The user is provided with prompts before the access is granted or a redirection is done. The prompt message and the destination URL are generated based on policy decisions in a markup language supported by client device. Exemplary markup languages can be Hyper Text Markup Language (HTML), Wireless Markup Language (WML) and Compact HTML (cHTML). The prompts are template based. An appropriate template is chosen for the prompt depending on the markup capability of the device. The prompt is then forwarded to the user.

The data is parsed by a data parser 210. Data parser 210 is a generic parser that parses all text based protocol data. Exemplary protocols can be HTTP, SIP and POP. Data parser 210 examines the header portion of the data packet and enables HTTP application handler 208 to decide the actions to be taken on the data packet. The parsing of data can be done by any known method in the art and would be evident to a person skilled in the art.

To provide content providers 106, third party application providers 108 and partner portals 110 with more information about the user and network capabilities to enable provision of better services, inline context injection is done in the HTTP header by HTTP application handler 208. This eliminates the need for content providers 106, third party service provider 108 and partner portals 110 to initiate a separate query to get relevant context information. Exemplary context information in such a case can be location of a user, device capability, the network characteristics, presence and availability and current credit status of the user.

In a preferred embodiment of the system, the context goes as a header field in the user request. By way of an example, HTTP header along with a context for a handheld device to AIG 102 is:

GET http://www.julysystems.com HTTP/1.1
Accept: */*
UA-OS: Windows CE (POCKET PC)—Version 3.0
UA-color: color16
UA-pixels: 240×320
UA-CPU: ARM PXA250
UA-Voice: FALSE
UA-Language: JavaScript
Accept-Encoding: gzip, deflate
User-Agent: Mozilla/2.0 (compatible; MSIE 3.02; Windows CE; PPC; 240×320)
Host: 192.168.100.58
Connection: Keep-Alive
Location: Bangalore In the above example, "Location: Bangalore" is the context that is injected in the header of the data packet.

In an alternate embodiment of the present invention, the context can also be sent as World Wide Web Consortium (W3C) Composite Capabilities/Preference Profiles (CC/PP) exchange protocol. By way of an example, a CC/PP device profile is:

```
<?xml version="1.0"?>
<RDF xmlns="http://www.w3.org/1999/02/22-rdf-syntax-ns#"
     xmlns:rdf="http://www.w3.org/1999/02/22-rdf-syntax-ns#"
     xmlns:prf="http://www.wapforum.org/profiles/UAPROF/
     ccppschema-
20010430#">
    <rdf:Description ID="MyDeviceProfile">
    <prf:component>
    <rdf:Description ID="HardwarePlatform">
    <rdf:type resource="http://www.wapforum.org/profiles/UAPROF/
    ccppschema20010430#HardwarePlatform"/>
    <prf:ScreenSize>121x87</prf:ScreenSize>
    <prf:Model>PocketPC </prf:Model>
    <prf:InputCharSet>
    <rdf:Bag>
    <prf:ColorCapable>Yes</prf:ColorCapable>
    <prf:TextInputCapable>Yes</prf:TextInputCapable>
    <prf:ImageCapable>Yes</prf:ImageCapable>
    <prf:SoundOutputCapable>Yes</prf:SoundOutputCapable>
    </rdf:Description>
    </prf:component>
    <prf:component>
    <rdf:Description ID="SoftwarePlatform">
    <rdf:type resource="http://www.wapforum.org/profiles/UAPROF/
    ccppschema20010430#SoftwarePlatform"/>
    <prf:AcceptDownloadableSoftware>Yes</prf:
    AcceptDownloadableSoftware>
    <prf:MemoryFree>155870</prf:MemoryFree>
    </rdf:Description>
    </prf:component>
```

A context engine 212 collects the context details for the user. Context engine 212 interacts with a context server 214 to update or query the relevant context. Context engine 212 extracts the context from HTTP header of data packets. The context that is queried from context server 214 comprises details about the network and user profile. Exemplary context that is collected from context server 214 is network type, network identifier, location information and user identification. Context engine 212 also provides the context to HTTP application handler 208 for inline context injection and updates context on context server 214. Context that is collected from the HTTP header contain the device profile and capabilities. Exemplary context that is collected from the device profile is the HTTP version supported, image capabilities, language supported, destination host URL, browser make and version and operating system make and version. Context engine 212 comprises a local context store 216. Local context store 216 caches the context details locally on AIG 102 so that the context need not be obtained from context server 214 each time.

The context is used for enforcement of policy decisions on the data packets. The policy decisions are enforced by an enforcement engine 218. The policy decisions are enforced on both the application request and the application response. Exemplary policy decisions on an application request can be to allow a particular access, deny the access, redirect to another web site, provide a payment prompt, an alert and passing context information to the content provider, third party application provider or partner portal. Exemplary policy decisions on application response can be compressing the data and removing all image content from the data packets.

The policy decisions are provided for enforcement by a policy component 220. Policy component 220 interacts with PDP 112. The decisions for all the policies to be implemented are taken at PDP 112. Policy component interacts with PDP 112 using Common Open Policy Service Protocol (COPS) and Policy Communication Protocol (PCOMP) for policy decisions. COPS and PCOMP are protocols for policy exchange.

The policy decision can be made in two ways. When AIG 102 needs a policy decision, it requests PDP 112 for the decision on the policy. PDP 112 may provide the policy decision to policy component 220 of AIG 102 for implementation when AIG 102 requests. Also, some policy decisions of AIG 102 may be provisioned beforehand by PDP 112. The provisioned policy decisions are stored in a local policy decision store 222 and are used for implementation when required. Each policy decision is locally cached in local policy decision store 222 to avoid requesting for policy decision every time from PDP 112.

Also as the service is being delivered to the user, a metering record is generated by a metering record generator 224. Metering record contains information about the user request, policies applied and the response to the user request. The metering record is sent to an accounting server for billing purpose. Also, the metering record can be used in future for analysis. Exemplary details that a metering record contains are user information such as MSISDN and IP Address, URL requested, time of connection, response size, context provided such as location, age and gender, device id such as IMEI and Mac Address and policy result such as prompt and redirection.

Figure 3:
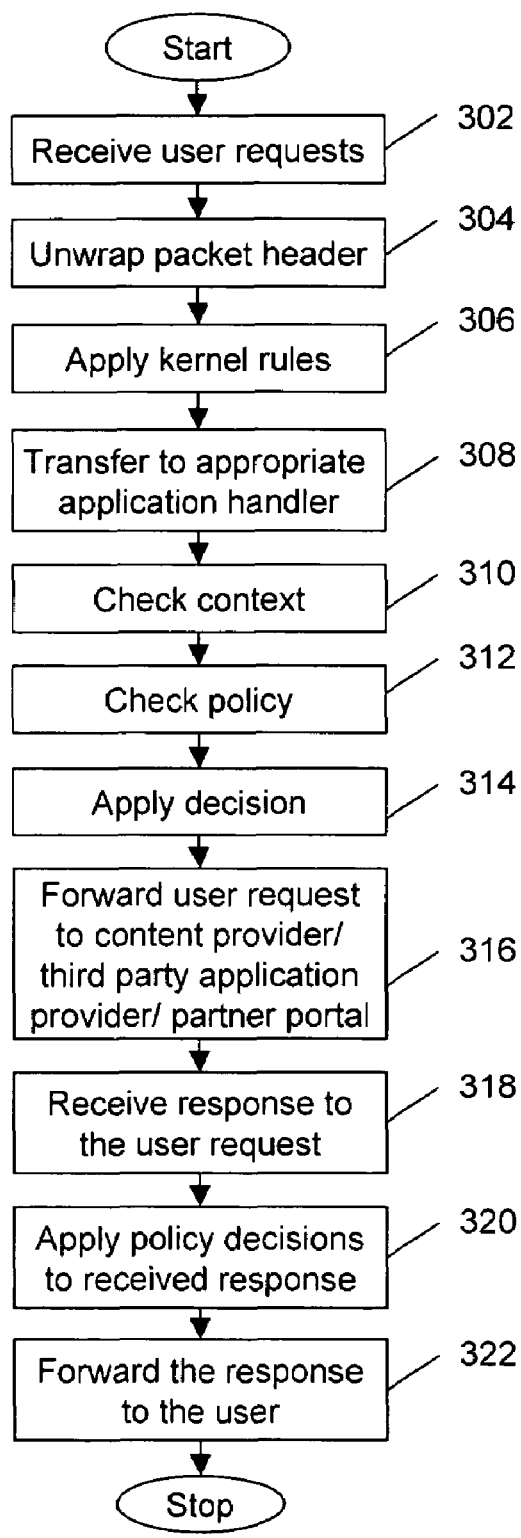
FIG. 3 is a flowchart illustrating the functioning of the present invention, in accordance with an embodiment of the present invention.

FIG. 3 is a flowchart illustrating the functioning of a preferred embodiment of the present invention.

At step 302, the system kernel 202 receives a user request. The request is in form of data packets. At step 304, the kernel hook unwraps the headers of the data packets and checks the source and destination IP addresses and the type of application request as described earlier. At step 306, the kernel hook implements the kernel rules on the data packets. An exemplary kernel rule can be to deny access of a particular source IP address. At step 308, the user request is transferred to an application handler that handles the type of application detected from the header of data packets.

At step 310, the context relating to the data packets is checked by context engine 212. The context is used for taking policy decisions on the user request. At step 312, it is determined which policy decisions are to be applied on the data packets. The policy decisions are taken by PDP 112. Also, PDP 112 may provision AIG 102 for the policy decisions. In case PDP 112 provisions AIG 102 for policy decisions, the decision is provided by local policy decision store 222.

At step 314, the policy decisions are implemented on the user request by enforcement engine 218. Depending on the policy decisions the user may be sent a payment prompt and the user response is waited or the user may be redirected to another address.

At step 316, the user request is forwarded to content provider 106, third party application provider 108 or partner portal 110. At step 318, the response from content provider 106, third party application provider 108 or partner portal 110 is received. At step 320, the policy decisions on the received response are applied. These decisions are also based on context. Exemplary policy decisions can be compressing the data to be sent and removing the images from the data. At step 322, the response is forwarded back to the user.

The application intermediation gateway, as described in the present invention or any of its components may be embodied in the form of a processing machine. Typical examples of a processing machine include a general purpose computer, a programmed microprocessor, a micro-controller, a peripheral integrated circuit element, and other devices or arrangements of devices, which are capable of implementing the steps that constitute the method of the present invention. The application intermediation gateway can also be embodied on network elements like routers or gateways.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for facilitating the provision of access to a plurality of applications to a user in a network, the network comprising a plurality of users, an application intermediation gateway, a context server and a plurality of service providers, the application intermediation gateway intermediating between the plurality of users and the plurality of service providers, the user requesting an application using a device, the request being in the form of a data packet, the application being provided by a corresponding service provider through the application intermediation gateway, the method comprising the steps of:
   a. collecting context details from at least one of the data packet and the context server, the context details being collected by the application intermediation gateway, the context details comprising information regarding the device characteristics, the network capabilities, and the user profile; and
   b. enforcing application level policies on the data packet depending on the collected context details, the application level policies being enforced by the application intermediation gateway for enabling access to the application requested by the user, the application level policies comprising policy decisions for provision of access, redirection of the request and prompting the user, wherein the policy decision for provision of access enables the provision of access to the application requested by the user, the access being provided by the corresponding service provider, the policy decision for redirection of the request forwards the request to a destination, the destination being different from the corresponding service provider, and the policy decision for prompting the user enables sending notifications to the user and taking inputs from the user for enabling access to the application requested by the user, the inputs not being related to the context details.

2. The method as recited in claim 1, wherein the application intermediation gateway is deployed in the network of a network operator.

3. The method as recited in claim 1, wherein the network is a wireless network.

4. The method as recited in claim 1, wherein the service providers comprise at least one of: a content provider, a third party application provider, and a partner portal.

5. The method as recited in claim 1 further comprising the step of injecting the context details collected from the context server into the data packet, the collected context details being injected inline by an application handler, the application handler being present in the application intermediation gateway, the application handler being specific to the type of application requested by the user.

6. A computer program product for use with a computer, the computer program product comprising a computer usable medium having a computer readable program code embodied therein for facilitating the provision of access to a plurality of applications to a user in a network, the network comprising a plurality of users, an application intermediation gateway, a context server and a plurality of service providers, the application intermediation gateway intermediating between the plurality of users and the plurality of service providers, the user requesting an application using a device, the request being in the form of a data packet, the application being provided by a corresponding service provider through the application intermediation gateway, the computer program code performing the steps of:
   a. collecting context details from at least one of the data packet and the context server, the context details being collected by the application intermediation gateway, the context details comprising information regarding the device characteristics, the network capabilities, and the user profile; and
   b. enforcing application level policies on the data packet depending on the collected context details, the application level policies being enforced by the application intermediation gateway for enabling access to the application requested by the user, the application level policies comprising policy decisions for provision of access, redirection of the request and prompting the user, wherein the policy decision for provision of access enables the provision of access to the application requested by the user, the access being provided by the corresponding service provider, the policy decision for redirection of the request forwards the request to a destination, the destination being different from the corresponding service provider, and the policy decision for prompting the user enables sending notifications to the user and taking inputs from the user for enabling access to the application requested by the user, the inputs not being related to the context details.

7. A method for facilitating the provision of applications by a plurality of service providers to a user through an application intermediation gateway, the user being a subscriber to an network operator's network, the operator's network operating the application intermediation gateway having an application handler and an enforcement engine, the user requesting for an application using a device, the request being in the form of a data packet, the data packet comprising an IP header and a TCP header, the application being provided by a corresponding service provider, the method comprising the steps of:

a. determining the type of application requested by the user, the application type being determined by unwrapping the TCP header of the data packet, the TCP header containing information regarding the application type;

b. forwarding the data packet to an application handler, the application handler being specific to the determined type of the application;

c. collecting context details from the data packet after forwarding the data packet to the application handler, the context details being collected by the application intermediation gateway, the context details comprising information regarding the device characteristics, network capabilities, and the user profile;

d. controlling access to the application requested by the user based on a predetermined policy decision for provision of access, the access control enabling access to the application requested by the user, the access control being performed by the application handler, the context details being used for enforcing the policy decision for provision of access, the policy decision for provision of access being enforced by an enforcement engine;

e. redirecting the request to a destination based on the policy decision for redirection of the request, the destination being different from the corresponding service provider, the redirection of the request being performed by the application handler, the context details being used for enforcing the policy decision for redirection of the request, the policy decision for redirection of the request being enforced by the enforcement engine;

f. prompting the user inline for sending notifications to the user and taking inputs from the user based on a policy decision for prompting the user, the inputs not being related to the context details, the prompting being performed for enabling access to the application requested by the user, the context details being used for enforcing the policy decision for prompting the user, the policy decision for prompting the user being enforced by the enforcement engine; and g. metering information about the request made by the user and the enforced policy decisions, the metered information generating records corresponding to the application requested by the user for billing purposes.

8. The method as recited in claim 7 further comprising the steps of:

a. collecting the context details from a context server, the context server being associated with at least one of the operator's network and the plurality of service providers;

b. injecting the context details collected from the context server into the data packet, the collected context details being injected inline by the application handler; and c. updating the context details on the context server, the context details being updated inline by the application handler.

9. The method as recited in claim 7, wherein the step of prompting the user is performed before at least one of the step of controlling access to the application requested by the user and the step of redirecting the request.

10. The method as recited in claim 7, wherein the step of redirecting the request comprises forwarding the request for a purpose selected from the group comprising at least one the steps of: payment of charges for accessing the application requested by the user, denial of access to the application requested by the user, downloading of software required for accessing the application requested by the user, signing a license agreement before the provision of access to the application requested by the user, and redirecting the request from the application handler to another application handler, the another application handler handling an application different from the application requested by the user.

11. A system for facilitating the provision of access to a user to a plurality of applications in a network, the system comprising:

a. at least one device, each device being used by the user for making requests for one or more applications, each request for an application made by the user being in the form of a data packet;

b. at least one service provider, each service provider providing access to the one or more applications requested by the user based on context details of the user present in the data packet, the context details comprising information regarding the user profile, the network capabilities and the device characteristics, each service provider being at least one of a content provider, a third party application provider, and a partner portal;

c. a context server containing the context details of the user, the context details collected from the context server being injected inline into the data packet, wherein the context server is associated with at least one of an operator's network and the at least one service provider to obtain the context details of the user;

d. a policy decision point, the policy decision point providing application level policies based on the collected context details present in the data packet without or after inline injection, the application level policies comprising policy decisions for provision of access, redirection of the requests for the one or more applications, and prompting the user, wherein the policy decision for provision of access enables the provision of access to the one or more applications requested by the user, the access being provided by a corresponding service provider, wherein the policy decision for redirection of the request forwards the request to a destination, the destination being different from the corresponding service provider, and the policy decision for prompting the user enables sending notifications to the user and taking inputs from the user for enabling access to the one or more applications requested by the user, the inputs not being related to the context details; and e. an application intermediation gateway, the application intermediation gateway being deployed in the operator's network, the application intermediation gateway intermediating between the at least one device and the at least one service provider, the application intermediation gateway including;

i. a context engine, the context engine collecting the context details from the data packet; and ii. an enforcement engine, the enforcement engine enforcing the application level policies on the data packet, the enforcement of the application level policies enabling access to the one or more applications.

12. The system as recited in claim 11, wherein the network is a wireless network.

* * * * *